US012244898B2

(12) United States Patent
Swerdlow et al.

(10) Patent No.: US 12,244,898 B2
(45) Date of Patent: Mar. 4, 2025

(54) AUTOMATED CONTENT RECOMMENDATION USING A METADATA BASED CONTENT MAP

(71) Applicant: Disney Enterprises, Inc., Burbank, CA (US)

(72) Inventors: Avner Swerdlow, Los Angeles, CA (US); Samuel C. Anderson, Hernando, MS (US); Anthony M. Accardo, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 401 days.

(21) Appl. No.: 16/275,238

(22) Filed: Feb. 13, 2019

(65) Prior Publication Data

US 2020/0077151 A1 Mar. 5, 2020

Related U.S. Application Data

(60) Provisional application No. 62/724,966, filed on Aug. 30, 2018.

(51) Int. Cl.
| | |
|---|---|
| *H04N 21/466* | (2011.01) |
| *G06F 16/735* | (2019.01) |
| *G06F 16/738* | (2019.01) |
| *G06F 16/74* | (2019.01) |
| *G06F 16/9535* | (2019.01) |
| *H04N 21/431* | (2011.01) |

(Continued)

(52) U.S. Cl.
CPC ....... *H04N 21/4668* (2013.01); *G06F 16/735* (2019.01); *G06F 16/738* (2019.01); *G06F 16/74* (2019.01); *G06F 16/9535* (2019.01); *H04N 21/4312* (2013.01); *H04N 21/44222* (2013.01); *H04N 21/4532* (2013.01)

(58) Field of Classification Search
CPC ......... H04N 21/4312; H04N 21/44222; H04N 21/4668; H04N 21/4532
USPC ....................................................... 725/139
See application file for complete search history.

(56) References Cited

U.S. PATENT DOCUMENTS

| | | | |
|---|---|---|---|
| 7,797,328 B2 * | 9/2010 | Styles ................... | G06F 16/367 707/758 |
| 2005/0240963 A1 * | 10/2005 | Preisman ........... | H04N 5/44543 725/44 |

(Continued)

*Primary Examiner* — Yassin Alata
(74) *Attorney, Agent, or Firm* — Farjami & Farjami LLP

(57) ABSTRACT

A content recommendation system includes a computing platform having a hardware processor and a system memory storing a content surfacing software code providing a user interface. The hardware processor executes the content surfacing software code to receive an initiation signal identifying a user, and, in response, identify content items as desirable content items to the user based on the user and metadata describing each of the desirable content items. In addition, the content surfacing software code generates a networked map of nodes corresponding respectively to the desirable content items, where the distances between nodes are based on the similarity of the metadata describing the desirable content items corresponding to the nodes. The content surfacing software code further outputs the networked map for display to the user via the user interface, the nodes being displayed as thumbnail images depicting the desirable content and selectable by the user.

20 Claims, 7 Drawing Sheets

(51) Int. Cl.
*H04N 21/442* (2011.01)
*H04N 21/45* (2011.01)

(56) References Cited

U.S. PATENT DOCUMENTS

| | | | | |
|---|---|---|---|---|
| 2007/0189737 | A1* | 8/2007 | Chaudhri | G06F 3/0482 |
| | | | | 386/234 |
| 2010/0153885 | A1* | 6/2010 | Yates | H04N 5/44543 |
| | | | | 715/841 |
| 2013/0166590 | A1* | 6/2013 | Kim | G06F 16/48 |
| | | | | 707/769 |
| 2016/0255410 | A1* | 9/2016 | Itoh | H04N 21/44222 |
| | | | | 725/14 |
| 2018/0367856 | A1* | 12/2018 | Hsu | H04N 21/4532 |
| 2019/0087435 | A1* | 3/2019 | Katardjiev | G06F 16/23 |
| 2019/0098370 | A1* | 3/2019 | Laeuchli | G06F 16/90348 |
| 2019/0286744 | A1* | 9/2019 | Wang | G06F 16/784 |
| 2019/0286757 | A1* | 9/2019 | Muntes-Mulero | G06F 11/079 |

* cited by examiner

AUTOMATED CONTENT RECOMMENDATION USING A METADATA BASED CONTENT MAP

RELATED APPLICATION(S)

The present application claims the benefit of and priority to Provisional Patent Application Ser. No. 62/724,966, filed Aug. 30, 2018, and titled "Granular Metadata Recommendations in a User Interface," which is hereby incorporated fully by reference into the present application.

BACKGROUND

Media content in the form of movie content and television (TV) programming content, for example, is consistently sought out and enjoyed by consumers. Nevertheless, the popularity of a particular item or items of such content, for example, a particular movie, TV series, or even a specific TV episode can vary widely. In some instances, that variance in popularity may be due to fundamental differences in personal taste amongst consumers. However, in other instances, the lack of consumer interaction with content may be due less to its inherent undesirability to those consumers than to their lack of familiarity with or reluctance to explore the content. Due to the resources often devoted to developing new content, the efficiency and effectiveness with which content likely to be desirable to consumers can be surfaced and identified to those consumers has become increasingly important to producers, owners, and distributors of media content.

SUMMARY

There are provided systems and methods for content recommendation using a metadata based content map, substantially as shown in and/or described in connection with at least one of the figures, and as set forth more completely in the claims.

DETAILED DESCRIPTION

Figure 1:
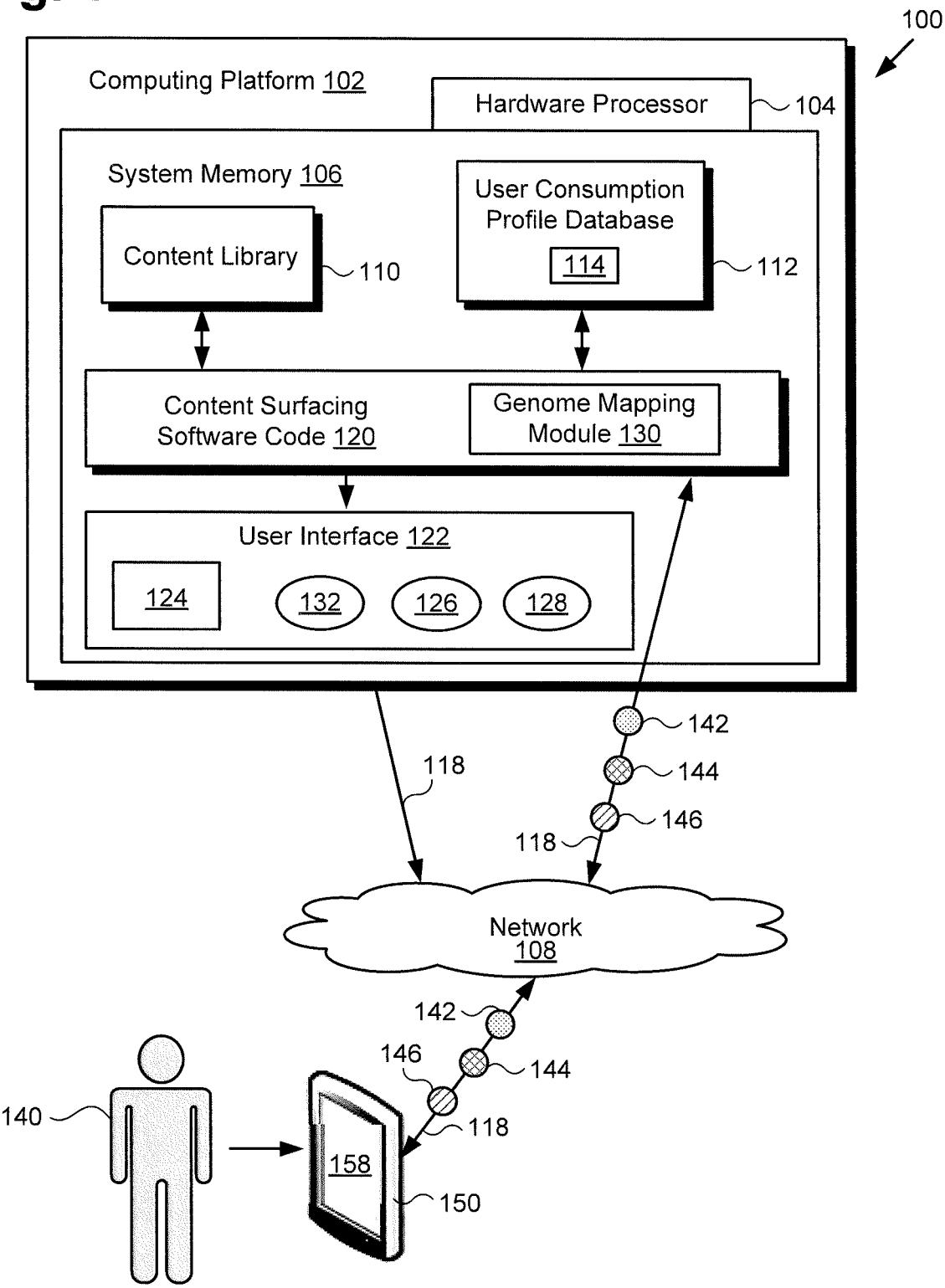
FIG. 1 shows an exemplary content recommendation system providing a metadata based content map, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses automated systems and methods for recommending content using a metadata based content map that address and overcome the deficiencies in the conventional art. By utilizing deep metadata describing content, and consumption history data specific to a user or a demographic associated with the user, the present application discloses an automated content recommendation solution capable of identifying content items likely to be desirable to the user. In addition, by generating a networked map of nodes corresponding respectively to the desirable content items in which distances between nodes are based on similarity of metadata amongst the content items corresponding to the nodes, the automated content recommendation solution disclosed herein advantageously surfaces content that the user may be unaware of. Moreover, by providing the networked map to the user via a user interface through which the nodes of the networked map are displayed as respective thumbnail images selectable by the user, the present content recommendation solution enables the user to navigate intuitively among the displayed content items.

It is noted that, as used in the present application, the terms "automation," "automated", and "automating" refer to systems and processes that do not require the participation of a human editor or curator. Although, in some implementations, a human editor or curator may review a recommendation made by the automated systems and according to the automated methods described herein, that human involvement is optional. Thus, the methods described in the present application may be performed under the control of hardware processing components of the disclosed automated systems.

FIG. 1 shows an exemplary system for performing automated content recommendation using a metadata based content map, according to one implementation. As shown in FIG. 1, content recommendation system 100 includes computing platform 102 having hardware processor 104 and system memory 106 implemented as a non-transitory storage device. According to the present exemplary implementation, system memory 106 stores content surfacing software code 120 including genome mapping module 130, user interface 122 provided by content surfacing software code 120, content library 110, and user consumption profile database 112. Also shown in FIG. 1 are media playout window 124, metadata based content map 132, content recommendation window 126, and character biography window 128 of user interface 122, as well as user consumption profile 114 stored in user consumption profile database 112.

As further shown in FIG. 1, content recommendation system 100 is implemented within a use environment including communication network 108, personal communication device 150 including display 158, and user 140 of personal communication device 150. In addition, FIG. 1 shows network communication links 118 of communication network 108 interactively connecting personal communication device 150 with content recommendation system 100. Also shown in FIG. 1 are initiation signal 142, content selection data 144, and content rejection data 146. It is noted that user consumption profile 114 includes a consumption profile for user 140.

It is further noted that, although the present application refers to content surfacing software code 120 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is also noted that although FIG. 1 depicts content surfacing software code 120, content library 110, and user consumption profile database 112 as being co-located in system memory 106, that representation is merely provided as an aid to conceptual clarity. More generally, content recommendation system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within content recommendation system 100.

According to the implementation shown by FIG. 1, user 140 may utilize personal communication device 150 to interact with content recommendation system 100 over communication network 108. In one such implementation, computing platform 102 may correspond to one or more web servers, accessible over a packet-switched network such as the Internet, for example. Alternatively, computing platform 102 may correspond to one or more computer servers supporting a local area network (LAN), or included in another type of limited distribution network.

Although personal communication device 150 is shown as a mobile computing device such as a smartphone or tablet computer in FIG. 1, that representation is also provided merely as an example. More generally, personal communication device 150 may be any suitable mobile or stationary personal communication device or system that implements data processing capabilities sufficient to support connections to communication network 108, and implement the functionality ascribed to personal communication device 150 herein. For example, in other implementations, personal communication device 150 may take the form of a desktop computer, a laptop computer, a smart TV, a digital media player, or a gaming console, for example.

User 140, who may be a consumer of media content such as movies, television (TV) programming content, or video games, for example, may utilize personal communication device 150 to interact with content recommendation system 100 via user interface 122. For example, user 140 may utilize media playout window 124 of user interface 122 to view content from content library 110 selected by user 140 via user interface 122 and rendered on display 158 of personal communication device 150. Display 158 of personal communication device 150 may take the form of a liquid crystal display (LCD), a light-emitting diode (LED) display, an organic light-emitting diode (OLED) display, or another suitable display screen that performs a physical transformation of signals to light.

Figure 2:
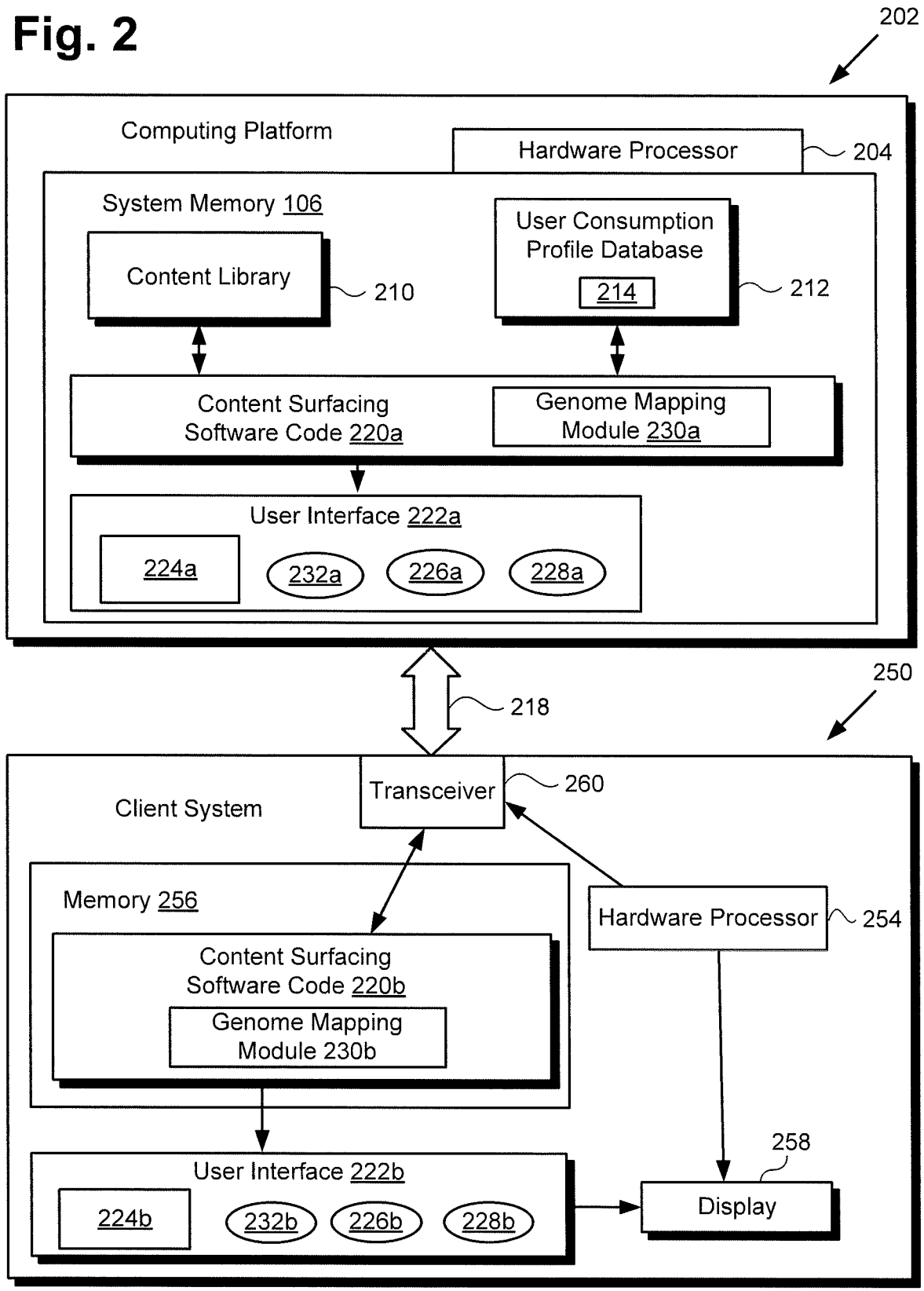
FIG. 2 shows a more detailed exemplary representation of a personal communication device suitable for use in interacting with the content recommendation system of FIG. 1, in combination with a computer server suitable for use as part of that system.

FIG. 2 shows a more detailed representation of exemplary personal communication device 250 in combination with computing platform 202 implemented as a computer server. As shown in FIG. 2, personal communication device 250 is communicatively coupled to computing platform 202 over network communication link 218. Computing platform 202 includes hardware processor 204, and system memory 206 storing content surfacing software code 220*a* including genome mapping module 230*a* and providing user interface 222*a*, content library 210, and user consumption profile database 212 including user consumption profile 214.

As further shown in FIG. 2, personal communication device 250 includes hardware processor 254, memory 256 implemented as a non-transitory storage device storing content surfacing software code 220*b* including genome mapping module 230*b*, and user interface 222*b* provided by content surfacing software code 220*b*. As also shown in FIG. 2, personal communication device 250 includes transceiver 260, and display 258 for rendering user interface 222*b*.

Network communication link 218 and computing platform 202 having hardware processor 204 and system memory 206, correspond respectively in general to network communication link 118 and computing platform 102 having hardware processor 104 and system memory 106, in FIG. 1. In addition, content surfacing software code 220*a* including genome mapping module 230*a*, and user interface 222*a*, in FIG. 2, correspond respectively in general to content surfacing software code 120 including genome mapping module 130, and user interface 122, in FIG. 1. In other words, content surfacing software code 220*a* including genome mapping module 230*a*, and user interface 222*a* may share any of the characteristics attributed to respective content surfacing software code 120 including genome mapping module 130, and user interface 122 by the present disclosure, and vice versa.

It is also noted that content library 210 and user consumption profile database 212 including user consumption profile 214, in FIG. 2, correspond respectively in general to content library 110 and user consumption profile database 112 including user consumption profile 114, in FIG. 1. Moreover, media playout window 224*a*, metadata based content map 232*a*, content recommendation window 226*a*, and character biography window 228*a* of user interface 222*a* correspond respectively to media playout window 124, metadata based content map 132, content recommendation window 126, and character biography window 128. Thus, media playout window 224*a*, metadata based content map 232*a*, content recommendation window 226*a*, and character biography window 228*a* may share any of the characteristics attributed to respective media playout window 124, metadata based content map 132, content recommendation window 126, and character biography window 128 by the present disclosure, and vice versa.

Personal communication device 250 and display 258 correspond in general to personal communication device 150 and display 158, in FIG. 1, and those corresponding features may share any of the characteristics attributed to either corresponding feature by the present disclosure. Thus, like personal communication device 150, personal communication device 250 may take the form of a smartphone, tablet computer, desktop computer, laptop computer, smart TV, digital media player, or gaming console, for example. In addition, and although not shown in FIG. 1, personal communication device 150 may include features corresponding to hardware processor 254, transceiver 260, memory 256 storing content surfacing software code 220b including genome mapping module 230b, and user interface 222b provided by content surfacing software code 220b. Moreover, like display 158, display 258 may be implemented as an LCD, an LED display, an OLED display, or any other suitable display screen that performs a physical transformation of signals to light.

With respect to content surfacing software code 220b, it is noted that in some implementations, content surfacing software code 220b may be a direct-to-consumer application providing user interface 222b for exchanging data, such as data corresponding to initiation signal 142, content selection data 144, and content rejection data 146 with computing platform 102/202. In some of those implementations, for example, content surfacing software code 220b may not include genome mapping module 230b.

However, in other implementations, content surfacing software code 220b may be an application including all of the features of content surfacing software code 120/220a, and may be capable of executing all of the same functionality. That is to say, in some implementations, content surfacing software code 220b corresponds to content surfacing software code 120/220a and may share any of the characteristics attributed to those corresponding features by the present disclosure.

Furthermore, media playout window 224b, metadata based content map 232b, content recommendation window 226b, and character biography window 228b of user interface 222b correspond respectively to media playout window 124/224a, metadata based content map 132/232a, content recommendation window 126/226a, and character biography window 128/228a. Thus, media playout window 224b, metadata based content map 232b, content recommendation window 226b, and character biography window 228b may share any of the characteristics attributed to respective media playout window 124/224a, metadata based content map 132/232a, content recommendation window 126/226a, and character biography window 128/228a by the present disclosure, and vice versa.

According to the exemplary implementation shown in FIG. 2, content surfacing software code 220b is located in memory 256, having been received via network communication link 118/218, either from computing platform 102/202 or an authorized third party source of content surfacing software code 220b. In one implementation, network communication link 118/218 corresponds to transfer of content surfacing software code 220b over a packet-switched network, for example.

Once transferred, for instance by being downloaded over network communication link 118/218, content surfacing software code 220b may be persistently stored in memory 256, and content surfacing software code 220b may be executed on personal communication device 150/250 by hardware processor 254. Hardware processor 254 may be the central processing unit (CPU) for personal communication device 150/250, for example, in which role hardware processor 254 runs the operating system for personal communication device 150/250 and executes content surfacing software code 220b. Thus, in some implementations, the computing platform for performing automated content recommendation using a metadata based content map may be part of personal communication device 150/250.

Figure 3:
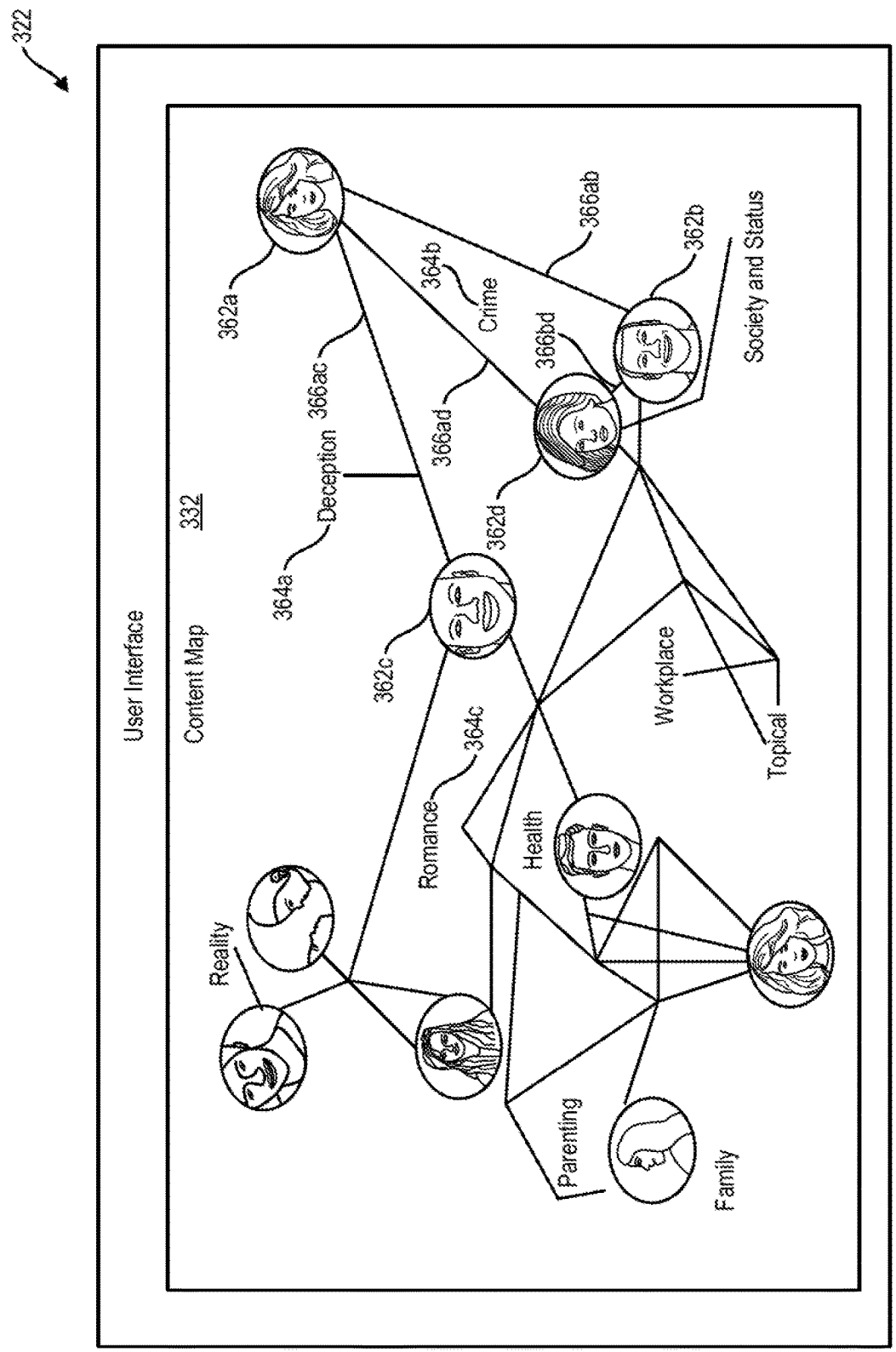
FIG. 3 shows an exemplary user interface displaying a metadata based content map and provided by the content recommendation system of FIG. 1, according to one implementation.

FIG. 3 shows exemplary user interface 322 provided by content surfacing software code 120/220a/220b, according to one implementation. As shown in FIG. 3 exemplary user interface 322 is displaying metadata based content map 332 as a networked map of nodes displayed as thumbnail images depicting content items identified by content surfacing software code 120/220a/220b as desirable to user 140. Example thumbnail images corresponding to nodes of networked metadata based content map 322 (hereinafter "nodes/thumbnail images") are identified by reference numbers 362a, 362b, 362c, and 362d. In addition, networked metadata based content map 332 displays story archetypes classifying the desirable content items and represented by exemplary "deception" story archetype 364a, "crime" story archetype 364b, and "romance" story archetype 364c. Also shown in FIG. 3 are mapping network links associating different desirable content items with one another, as well as the story archetypes with which they can be classified.

It is noted that the distances between nodes/thumbnail images corresponding respectively to content items identified as desirable to user and displayed on metadata based content map 332 may be based on the similarity of the metadata describing each of the nodes. For example, distance 366ac between node/thumbnail image 362a and node/thumbnail image 362c corresponds to the similarity between the metadata describing the desirable content items corresponding respectively to nodes/thumbnail images 362a and 362c.

As a specific example, nodes/thumbnail images 362b and 362d are both associated with the genome metadata story archetype "crime" 364b. In addition, nodes/thumbnail images 362b and 362d are both associated with heroic character archetypes having similar character motivations. As a result, nodes/thumbnail images 362b and 362d are closely located to one another on metadata based content map 332, as shown by distance 366bd.

Moreover, although all three of nodes/thumbnail images 362a, 362b, and 362d are associated with the genome metadata story archetype "crime" 364b, nodes/thumbnail images 362a and 362d are more closely associated with the genome metadata story archetype "deception" 364a, as well as with female heroic characters archetypes than is node/thumbnail image 362b. Consequently, distance 366ad separating nodes/thumbnail images 362a and 362d is less than distance 366ab separating nodes/thumbnail images 362a and 362b. That is to say, nodes/thumbnail images 362a and 362d are closer to one another than are nodes/thumbnail images 362a and 362b.

As yet another example, although nodes/thumbnail images 362a and 362c share an association with the genome metadata story archetype "deception" 364a, as well as with metadata describing female lead characters, their character archetypes may be different, e.g., heroic vs. villainous. In addition, the character motivations associated with nodes/thumbnail images 362a and 362b may be quite different, resulting in distance 366ac being greater than either of distances 366ad or event 366ab.

It is further noted that although the nodes/thumbnail images shown in FIG. 3 are depicted as having the same size, that representation is merely exemplary. In some implementations, the nodes/thumbnail images displayed on metadata based content map 332 may be sized according to their predicted desirability to user 140. That is to say, the more desirable a particular content item is predicted to be to user 140, the larger may be its thumbnail on metadata based content map 332.

User interface 322 and networked metadata based content map 332 correspond respectively in general to user interface 122/222a/222b and metadata based content map 132/232a/232b, in FIGS. 1 and 2. That is to say, user interface 322 and networked metadata based content map 332 may share any of the characteristics attributed to respective user interface 122/222a/222b and metadata based content map 132/232a/232b by the present disclosure, and vice versa.

Figure 4A:
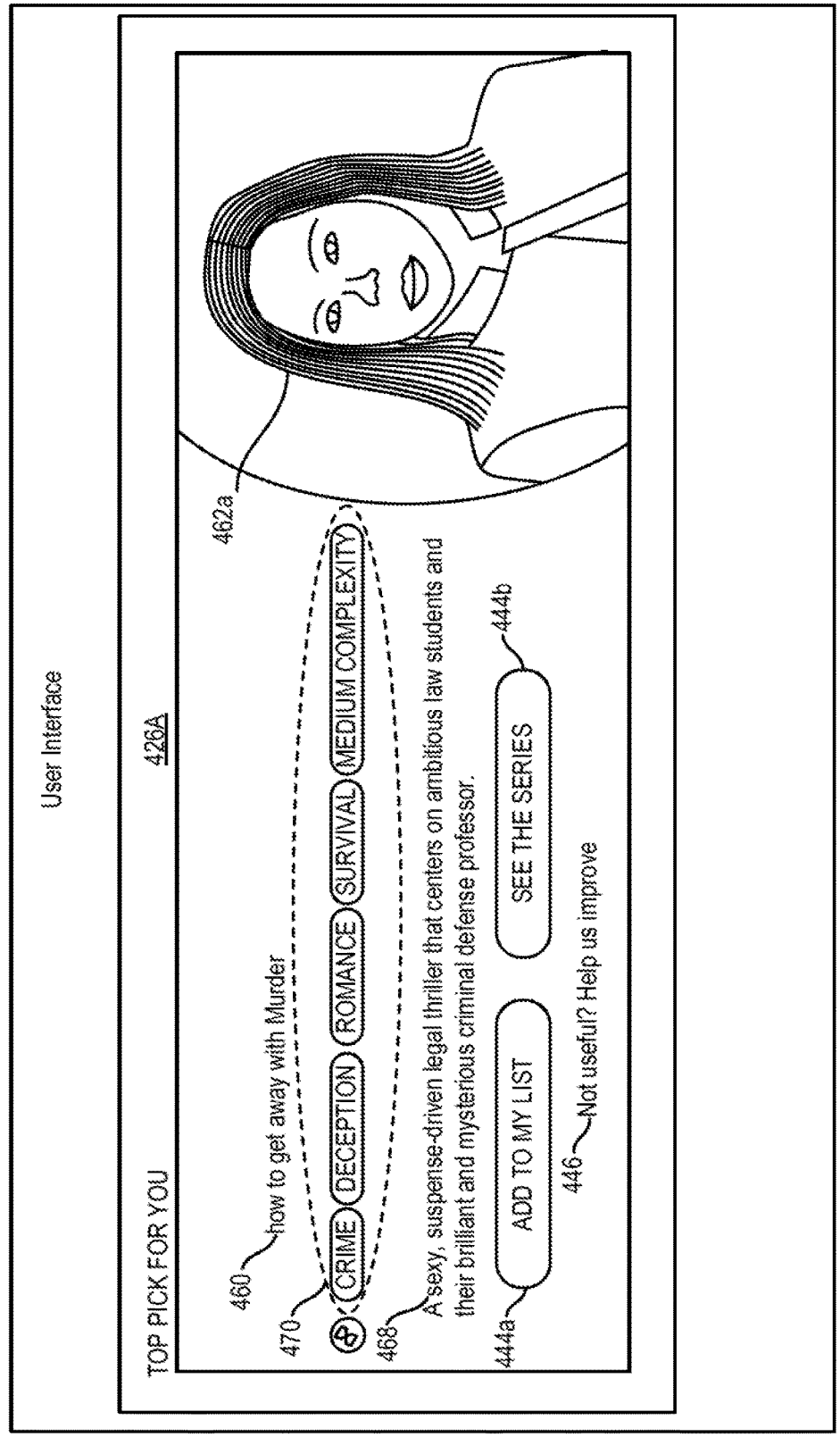
FIG. 4A shows an exemplary user interface of the content recommendation system of FIG. 1 displaying a content recommendation window, according to one implementation.
Figure 4B:
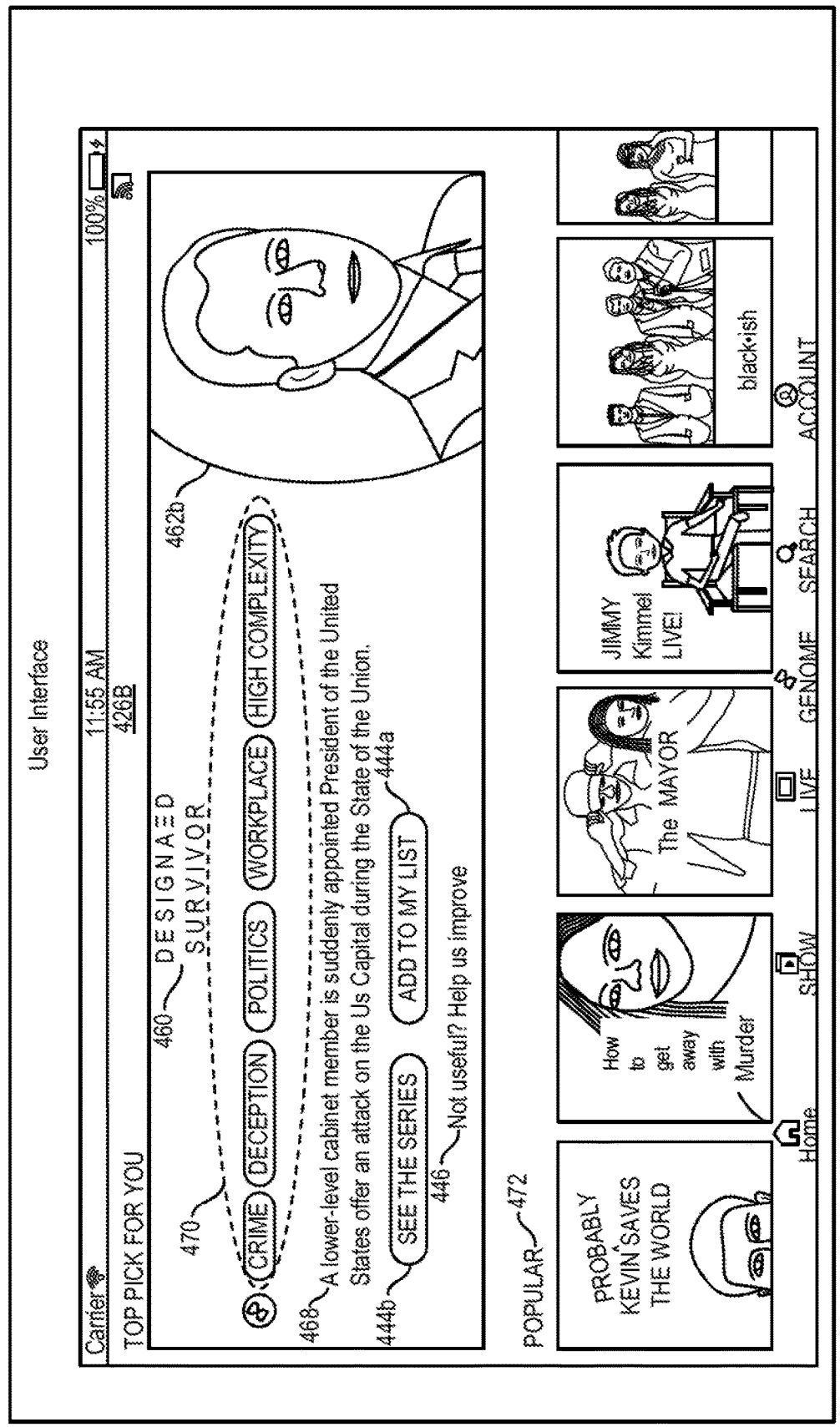
FIG. 4B shows an exemplary user interface of the content recommendation system of FIG. 1 displaying a content recommendation window, according to another implementation.

Referring to FIGS. 4A and 4B, FIG. 4A shows exemplary content recommendation window 426A of user interface 422, according to one implementation, while FIG. 4B shows exemplary content recommendation window 426B of user interface 422, according to another implementation. Exemplary content recommendation window 426A displays metadata associated with the content item corresponding to node/thumbnail image 362a of networked metadata based content map 132/232a/232b/332. Examples of such metadata include content item title 460, thumbnail image 462a associated with the content item, and synopsis 468 of the recommended content item. Similarly, exemplary content recommendation window 426B displays metadata associated the content item corresponding to node/thumbnail image 362b of networked metadata based content map 132/232a/232b/332, such as content item title 460, thumbnail image 462b, and synopsis 468.

In addition, each of exemplary content recommendation windows 426A and 426B displays exemplary genome metadata such as "story archetype" tag or tags 468 associated with the recommended content item. Each of exemplary content recommendation windows 426A and 426B also displays selection options "add to my list" 444a and "see the series" 444b, as well as rejection option 446. Exemplary content recommendation window 426B further displays related content links 472 to more detailed descriptions of other popular content items that may be desirable to user 140.

User interface 422 corresponds in general to user interface 122/222a/222b/322, in FIGS. 1, 2, and 3. Consequently user interface 422 may share any of the characteristics attributed to user interface 122/222a/222b/322 by the present disclosure, and vice versa. Each of content recommendation windows 426A and 426b corresponds in general to content recommendation window 126/226a/226b, in FIGS. 1 and 2. Thus, content recommendation window 126/226a/226b may share any of the features shown and described by reference to FIGS. 4A and 4B.

It is noted that selection options 444a and 444b, in FIGS. 4A and 4B, can correspond in general to selection data 144, in FIG. 1, while rejection option 446 can correspond in general to rejection data 146. It is further noted that thumbnail images 462a and 462b correspond respectively in general to nodes/thumbnail images 362a and 362b included on metadata based content map 132/232a/232b/332.

Figure 5:
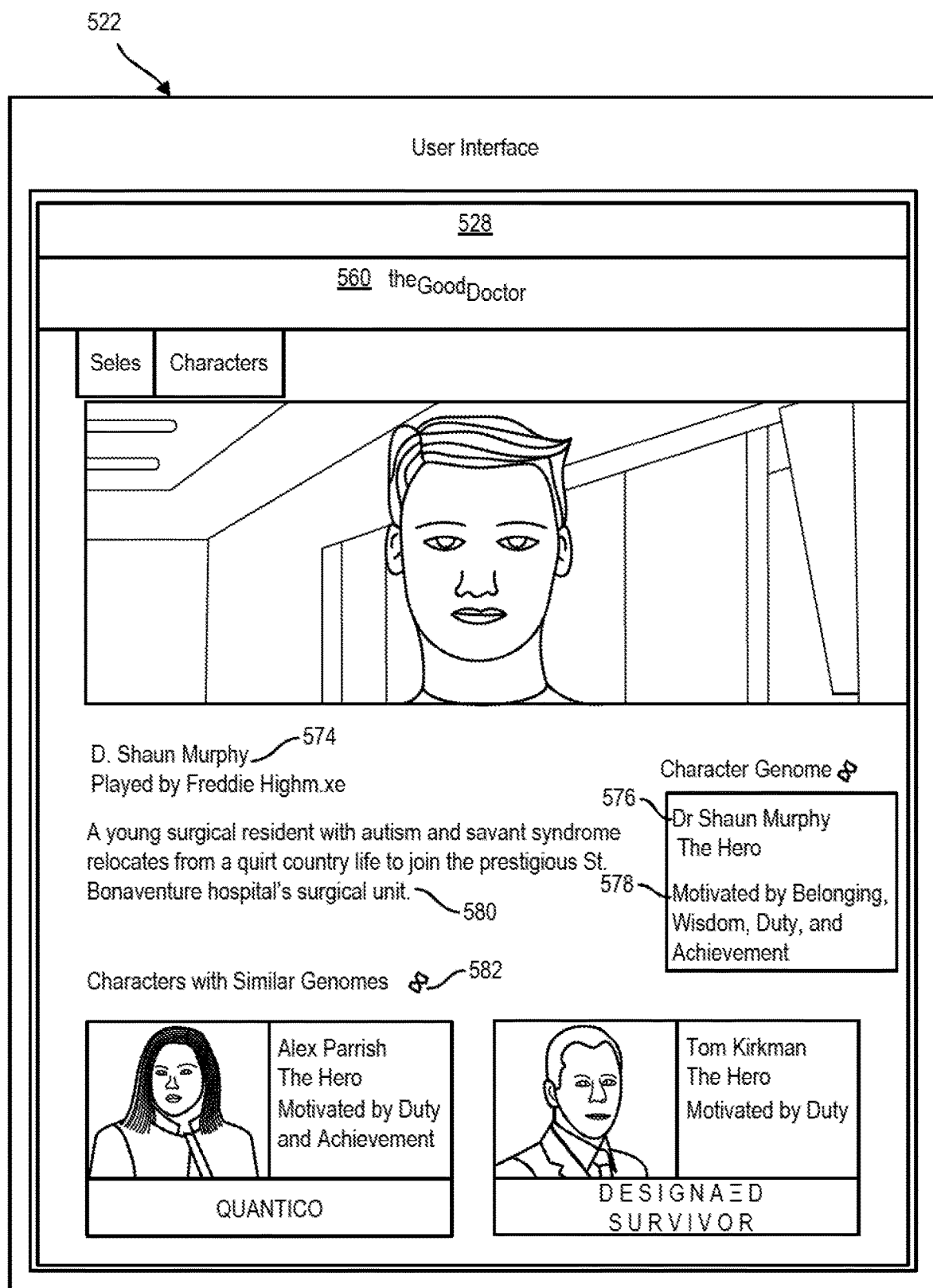
FIG. 5 shows an exemplary user interface of the content recommendation system of FIG. 1 displaying a character biography window, according to one implementation.

FIG. 5 shows user interface 522 displaying exemplary character biography window 528, according to one implementation. As shown in FIG. 5, character biography window 528 is dedicated to a single character 574 and displays metadata identifying character 574, metadata identifying title 560 of the content item including the character, and metadata providing brief description 580 of the character. In addition, exemplary character biography window 528 displays genome metadata in the form of character archetype tag "hero" 576 and character motivation tags 578 associated with character 574. Exemplary character biography window 528 also identifies other characters 582 associated with similar genome metadata tags.

User interface 522 corresponds in general to user interface 122/222a/222b/322/422, in FIGS. 1, 2, 3, and 4. Consequently user interface 522 may share any of the characteristics attributed to user interface 122/222a/222b/322/422 by the present disclosure, and vice versa. Character biography window 528 corresponds in general to character biography window 128/228a/228b, in FIGS. 1 and 2. Thus, character biography window 128/228a/228b may share any of the features shown and described by reference to FIG. 5.

Figure 6:
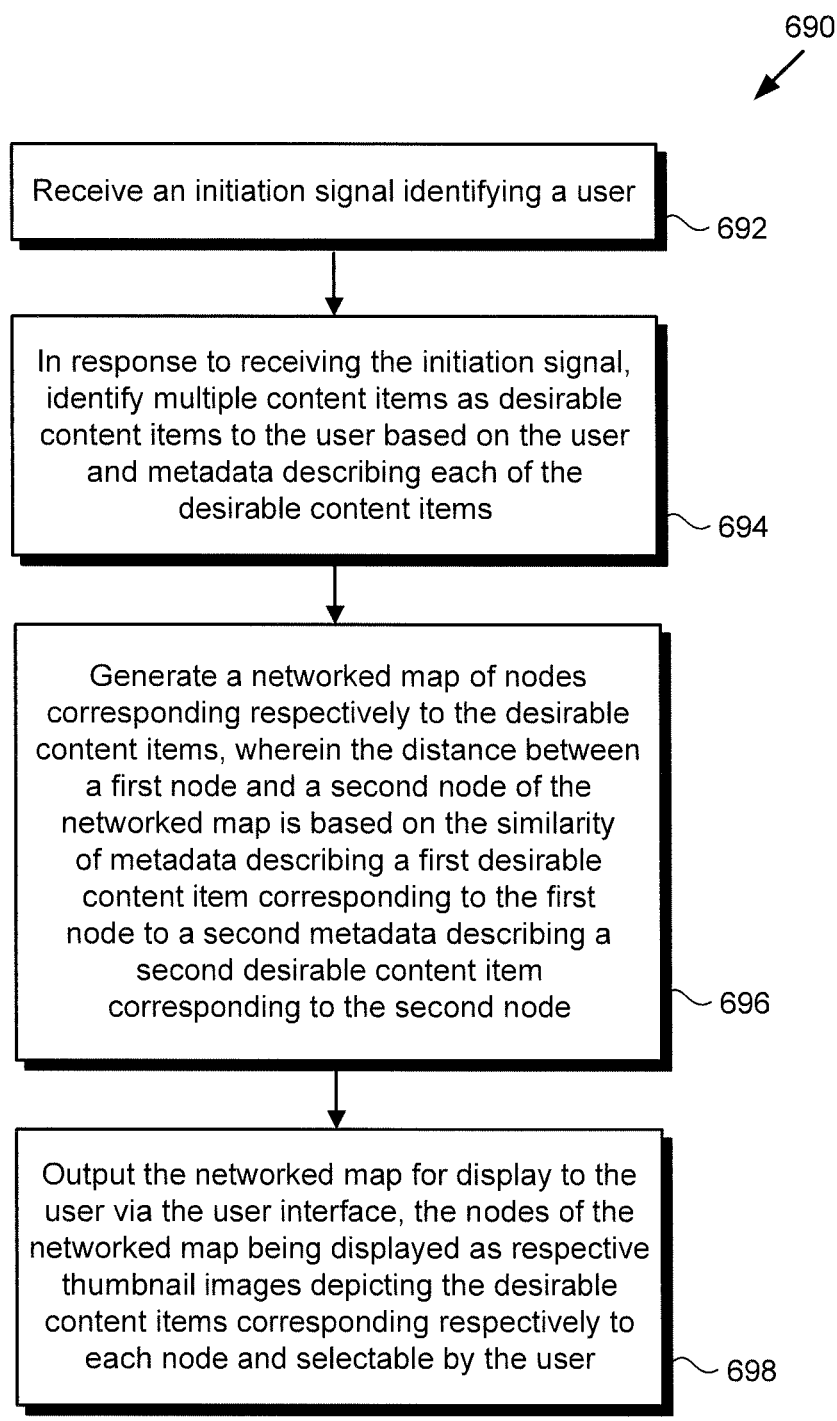
FIG. 6 shows a flowchart presenting an exemplary method for recommending content using a metadata based content map, according to one implementation.

The functionality of content surfacing software code 120/220a/220b will be further described by reference to FIG. 6. FIG. 6 shows flowchart 690 presenting an exemplary method for use by a system, such as content recommendation system 100, or personal communication device 150/250, for performing automated content recommendation using a metadata based content map. With respect to the method outlined in FIG. 6, it is noted that certain details and features have been left out of flowchart 690 in order not to obscure the discussion of the inventive features in the present application.

Referring to FIG. 6, with further reference to FIGS. 1 and 2, flowchart 690 begins with receiving initiation signal 142 identifying user 140 (action 692). For example, in one implementation, initiation signal 142 may correspond to selection of an application icon corresponding to content surfacing software code 120/220a/220b, either resident on personal communication device 150/250 or accessible via communication network 108 and network communication links 118/218, that initiates execution of content surfacing software code 120/220a/220b.

As shown by FIGS. 1 and 2, in one implementation, initiation signal 142 may be transmitted by personal communication device 150/250, using transceiver 260, to computing platform 102/202 via network 108 and network communication links 118/218. In those implementations, initiation signal 142 may be received by content surfacing software code 120/220a, executed by hardware processor 104/204 of computing platform 102/202. However, in other implementations, initiation signal 142 may be received by content surfacing software code 220b, executed by hardware processor 254 of personal communication device 150/250, as an input to user interface 222b provided by user 140.

Flowchart 690 continues with, in response to receiving initiation signal 142, identifying multiple content items as desirable content items to user 140, based on user 140 and metadata describing each of the desirable content items (action 694). The content items identified as desirable to user 140 may take a variety of forms. For instance, those content items may be audio-visual content, such as a movie, a TV series, a single episode of TV programming content, or a video game, for example.

In use cases in which user consumption profile database 112/212 includes a consumption history specific to user 140, i.e., user consumption profile 114/214, identification of content items as desirable content items to user 140 may be performed by reference to user consumption profile 114/214. Moreover, in some implementations, content items may be identified as desirable content items to user 140 based on one or more of a character archetype, a character motivation, and a story archetype of each of the content items. In implementations in which initiation signal 142 is received by content surfacing software code 120/220a on computing platform 102/202, identification of desirable content items to user 140 may be performed by content surfacing software code 120/220a, executed by hardware processor 104/204, using user consumption profile 114/214.

In implementations in which initiation signal 142 is received by content surfacing software code 220*b* via user interface 222*b*, content surfacing software code 220*b* may access user consumption profile database 112/212 on computing platform 102/202 using transceiver 260, communication network 108, and network communication links 118/218. In those implementations, identification of desirable content items to user 140 may be performed by content surfacing software code 220*b*, executed by hardware processor 254 of personal communication device 150/250, and using user consumption profile 114/214.

In use cases in which user consumption profile database 112/212 does not include user consumption profile 114/214 specific to user 140, identification of desirable content items to user 140 may be performed using collaborative filtering recommendation techniques. That is to say, in some implementations, identification of desirable content items to user 140 may be performed by reference to a consumption profile of a demographic of content consumers determined to be similar to user 140. For example, even without access to user consumption profile 114/214 specific to user 140, a preliminary identification of content items likely to be desirable to user 140 may be based on information such as the age and gender of user 140 and usage data for that portion of a known content consumer population having a similar age and the same gender.

In some implementations, a preliminary identification of desirable content to user 140 may be based on the geographic region in which user 140 resides, as well as the nature of personal communication device 150/250. For example, where personal communication device 150/250 is a gaming console, reference to a demographic of content consumer population that utilizes gaming consoles may reveal that video game content is more likely to be desirable to user 140 than movie or TV content.

Referring to FIG. 3 in combination with FIGS. 1, 2, and 6, flowchart 690 continues with generating networked metadata based content map 132/232*a*/232*b*/332 of nodes corresponding respectively to the desirable content items identified in action 694 (action 696). As discussed above, the distance between nodes corresponding respectively to content items identified as desirable to user 140 may be based on the similarity of the metadata describing each of the nodes. For example, distance 366*ac* between the node/thumbnail image 362*a* and node/thumbnail image 362*c* corresponds to the similarity between the metadata describing the desirable content items corresponding respectively to nodes/thumbnail images 362*a* and 362*c*.

As noted above, the desirable content items included on networked metadata based content map 132/232*a*/232*b*/332 may take a variety of forms, such as movies, TV programming content, and video games, for example. In use cases in which the desirable content items included on metadata based content map 132/232*a*/232*b*/332 are movies or TV programs, for example, the similarity in metadata describing the desirable content items and used to determine distances between desirable content items on networked metadata based content map 132/232*a*/232*b*/332 may be evaluated and determined per storyline of each desirable content item.

In implementations in which desirable content items to user 140 are identified in action 694 by content surfacing software code 120/220*a*, generation of networked metadata based content map 132/232*a*/232*b*/332 may also be performed by content surfacing software code 120/220*a*, executed by hardware processor 104/204, and using genome mapping module 130/230*a*. However, in implementations in which desirable content items to user 140 are identified in action 694 by content surfacing software code 220*b*, generation of networked metadata based content map 132/232*a*/232*b*/332 may be performed by content surfacing software code 220*b*, executed by hardware processor 254, and using genome mapping module 230*b*.

Flowchart 690 can conclude with outputting networked metadata based content map 132/232*a*/232*b*/332 for display to user 140 via user interface 122/222*a*/222*b*/322 (action 698). It is noted that the nodes of networked metadata based content map 132/232*a*/232*b*/332 are displayed as respective thumbnail images depicting the desirable content items corresponding respectively to each node, as shown by exemplary nodes/thumbnail images 362*a*, 362*b*, 362*c*, and 362*d* in FIG. 3. It is further noted that each node/thumbnail image included on networked metadata based content map 132/232*a*/232*b*/332 is selectable by user 140 and may enable user 140 to navigate to one or more user interface windows dedicated to the desirable content item corresponding to the selected node/thumbnail image.

As also shown by exemplary nodes/thumbnail images 362*a*, 362*b*, 362*c*, and 362*d*, in some implementations, each of the nodes/thumbnail images may depict a character from the desirable content item corresponding respectively to each node, such as a character from a movie, or a character from a TV program. Furthermore, and as discussed above, in some implementations, the thumbnail images displayed on networked metadata based content map 132/232*a*/232*b*/332 may be sized according to their predicted desirability to user 140. That is to say, a desirable content item predicted to be more desirable to user 140 than other desirable content items may be represented on networked metadata based content map 132/232*a*/232*b*/332 by a thumbnail that is larger than thumbnail corresponding to other, less desirable content items.

Alternatively, or in addition, in some implementations, the thumbnail images displayed on networked metadata based content map 132/232*a*/232*b*/332 may be centered or otherwise located on metadata based content map 132/232*a*/232*b*/332 according to their predicted desirability to user 140. For example, a desirable content item predicted to be more desirable to user 140 than other desirable content items may be represented by a thumbnail image located closer to the center of networked metadata based content map 132/232*a*/232*b*/332 than thumbnail images corresponding to other, less desirable content items.

In implementations in which generation of networked metadata based content map 132/232*a*/232*b*/332 is performed in action 696 by content surfacing software code 120/220*a*, networked metadata based content map 132/232*a*/232*b*/332 may be output for display to user 140 via user interface 122/222*a*/222*b*/322 by content surfacing software code 120/220*a*, executed by hardware processor 104/204. However, in implementations in which generation of networked metadata based content map 132/232*a*/232*b*/332 is performed in action 696 by content surfacing software code 220*b*, networked metadata based content map 132/232*a*/232*b*/332 may be output for display to user 140 via user interface 122/222*a*/222*b*/322 by content surfacing software code 220*b*, executed by hardware processor 254. Moreover, hardware processor 254 of personal communication device 150/250 may be further configured to render networked metadata based content map 132/232*a*/232*b*/332 on display 158/258.

Thus, when user 140 opens an application corresponding to content surfacing software code 120/220*a*/220*b*, user 140 generates initiation signal 142. As a result, user 140 can advantageously be presented with networked metadata based content map 132*a*/232*a*/232*b*/332 displaying nodes/ thumbnail images corresponding respectively to content items identified as desirable to user 140. Identification of the desirable content items is based on metadata, including genome metadata such as story archetype, character archetype, and character motivations associated with each content item. Moreover, user 140 may select any of the thumbnail images included on networked metadata based content map 132*a*/232*a*/232*b*/332 and may thereby navigate to one or more user interface windows dedicated to the desirable content item corresponding to the thumbnail image.

For example, selection of node/thumbnail image 362*a* of networked metadata based content map 132/232*a*/232*b*/332 by user 140 may result in navigation to content recommendation window 426A. As discussed above, content recommendation window 426A describes the desirable content item corresponding to thumbnail image 362*a*/462*a*, and enables user 140 to further select the desirable content item using one of selection options 444*a* or 444*b*, or to reject the content item as undesirable using rejection option 446.

Alternatively, selection of node/thumbnail image 362*b* of networked metadata based content map 132/232*a*/232*b*/332 by user 140 may result in navigation to content recommendation window 426B. Content recommendation window 426B describes the desirable content item corresponding to thumbnail image 362*b*/462*b*, and enables user 140 to further select the desirable content item using one of selection options 444*a* or 444*b*, or to reject the content item as undesirable using rejection option 446.

Thus, in some implementations, content surfacing software code 120/220*a* may be executed by hardware processor 104/204 of computing platform 102/202 to receive content selection data 144 identifying one of the desirable content items corresponding respectively to thumbnail images 362*a* or 362*b* as a selected content item. In those implementations, hardware processor 104/204 may further execute content surfacing software code 120/220*a* to navigate to a respective one of content recommendation windows 426A or 426B of user interface 422 enabling sampling of the selected content item by user 144, for example via selection option 444*b*.

In other implementations, content surfacing software code 220*b* may be executed by hardware processor 254 of personal communication device 150/250 to receive content selection data 144 identifying one of the desirable content items corresponding respectively to thumbnail images 362*a* or 362*b* as an input to personal communication device 150/250 by user 140. In those implementations, hardware processor 254 may further execute content surfacing software code 120/220*a* to navigate to a respective one of content recommendation windows 426A or 426B of user interface 422 enabling sampling of the selected content item by user 144, for example via selection option 444*b*.

As another example, selection of another thumbnail image of networked metadata based content map 132/232*a*/232*b*/332 by user 140 may result in navigation to character biography window 528. As discussed above, character biography window 528 profiles character 574 by providing brief description 580 of character 574, as well as displaying genome metadata in the form of character archetype tag 576 and character motivation tags 578 associated with character 574. Exemplary character biography window 528 also enables identification of one or more other characters 582 in other content items having character traits similar to character 574, i.e., other characters associated with similar genome metadata tags.

Thus, in some implementations, content surfacing software code 120/220*a* may be executed by hardware processor 104/204 of computing platform 102/202 to receive content selection data 144 and navigate to character biography window 528. In other implementations, content surfacing software code 220*b* may be executed by hardware processor 254 of personal communication device 150/250 to receive content selection data 144 and navigate to character biography window 528.

In some implementations, receipt of content selection data 144/444*a*/444*b* or content rejection data 146/446 by content surfacing software code 120/220*a*/220*b* may cause content surfacing software code 120/220*a*/220*b* to use genome mapping module 130/230*a*/230*b* to dynamically rearrange networked metadata based content map 132/232*a*/232*b*/332 in response. For example, where a desirable content item initially identified as less desirable than other content items is selected by user 140 via selection option 444*a* or 444*b*, networked metadata based content map 132/232*a*/232*b*/332 may be dynamically rearranged through enlargement and/or relocation of the thumbnail image corresponding to the selected content item. Moreover, other desirable content items having similar metadata tags may also have their corresponding thumbnail images analogously enlarged and/ or relocated.

By contrast, where a content item initially identified desirable and included on networked metadata based content map 132/232*a*/232*b*/332 is rejected by user 140 via rejection option 446, networked metadata based content map 132/232*a*/232*b*/332 may be dynamically rearranged through removal, reduction in size, and/or relocation of the thumbnail image corresponding to the rejected content item. Moreover, other content items having similar metadata tags may also have their corresponding thumbnail images analogously removed, reduced in size, and/or relocated.

As another example, where a node/thumbnail image corresponding to a desirable content item is dragged or otherwise relocated to a new location on networked metadata based content map 132/232*a*/232*b*/332, or even off of networked metadata based content map 132/232*a*/232*b*/332 by an input to user interface 122/222*a*/222*b*/322 by user 140, networked metadata based content map 132/232*a*/232*b*/332 may be dynamically rearranged in response. For instance, depending on the nature of the relocation, e.g., from the periphery towards to center, or from the center towards the periphery or off of networked metadata based content map 132/232*a*/232*b*/332 entirely, the node/thumbnail image may be enlarged, reduced in size, or may disappear. Moreover, other desirable content items having similar metadata tags may also have their corresponding thumbnail images analogously enlarged, reduced in size, relocated, or removed.

In some implementations, hardware processor 104/204 or 254 may further execute respective content surfacing software code 120/220*a* or 210*b* to improve its performance through machine learning. For example, content surfacing software code 120/220*a*/220*b* may track inputs to user interface 122/222*a*/222*b*/322/422/522 by user 140 and record which content items are selected, which are rejected, and which are ignored. That information can be used as feedback to content surfacing software code 120/220*a*/220*b* including genome mapping module 130/230*a*/230*b*, to better learn the content consumption preferences of user 140.

Thus, the present application discloses automated systems and methods for recommending content using a metadata based content map. By utilizing deep metadata including genome metadata describing content, and consumption history data specific to a user or a demographic associated with the user, the present application discloses an automated content recommendation solution capable of identifying content items likely to be desirable to the user. By generating a networked metadata based content map of nodes corresponding respectively to the content items in which distances between nodes are based on similarity of metadata amongst the content items corresponding to the nodes, the automated content recommendation solution disclosed herein advantageously surfaces desirable content that the user may be unaware of. Moreover, by providing the networked metadata based content map to the user via a user interface through which the nodes of the networked map are displayed as respective thumbnail images selectable by the user, the present content recommendation solution enables the user to navigate intuitively among the displayed content items.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content recommendation system comprising:
a computing platform including a hardware processor and a system memory;
a content surfacing software code stored in the system memory, the content surfacing software code providing a user interface;
the hardware processor configured to execute the content surfacing software code to:
receive an initiation signal identifying a user;
in response to receiving the initiation signal, identify a plurality of content items as desirable content items to the user based on the user and metadata describing each of the desirable content items, wherein each of the desirable content items is a different audio-visual content;
display, on the user interface, a networked map of nodes corresponding respectively to the desirable content items, wherein a distance between a first node and a second node of the networked map, when displayed on the user interface, is based on a similarity of a first metadata describing a first desirable content item corresponding to the first node to a second metadata describing a second desirable content item corresponding to the second node, and wherein the nodes of the networked map, when displayed on the user interface, are respective thumbnail images obtained from the desirable content items corresponding respectively to each node and selectable by the user.

2. The content recommendation system of claim 1, wherein the respective thumbnail images, when displayed on the user interface, are sized according to their predicted desirability to the user.

3. The content recommendation system of claim 1, wherein each of the desirable content items comprises one of a television program or a movie.

4. The content recommendation system of claim 1, wherein the similarity of the first metadata to the second metadata is determined per storyline of at least one of the first desirable content item or the second desirable content item.

5. The content recommendation system of claim 1, wherein each of the thumbnail images, when displayed on the user interface, depicts a character from the desirable content item corresponding respectively to each node.

6. The content recommendation system of claim 1, wherein the hardware processor is further configured to execute the content surfacing software code to:
receive a content selection data identifying one of the desirable content items as a selected content item; and
navigate to a character biography window of the user interface, the character biography window profiling a character from the selected content item and enabling identification of at least one other character in another desirable content item having character traits similar to the character.

7. The content recommendation system of claim 1, wherein the plurality of content items are identified as desirable content items to the user based on at least one of a character archetype, a character motivation, or a story archetype of each of the plurality of content items, and wherein the hardware processor is further configured to execute the content surfacing software code to display, on the user interface, the at least one of the character archetype, the character motivation, or the story archetype in association with two or more neighboring nodes of the nodes.

8. The content recommendation system of claim 7, wherein the plurality of content items are further identified as desirable content items to the user based on a user consumption profile of the user.

9. The content recommendation system of claim 1, wherein the hardware processor is further configured to execute the content surfacing software code to:
receive a content selection data identifying one of the desirable content items as a selected content item; and
navigate to a content recommendation window of the user interface.

10. The content recommendation system of claim 1, wherein the hardware processor is further configured to execute the content surfacing software code to:
receive one of a content selection data or a content rejection data identifying one of the desirable content items; and
dynamically rearrange the networked map in response to receiving the one of the content selection data or the content rejection data.

11. A method for use by a content recommendation system including a computing platform having a hardware processor and a system memory storing a content surfacing software code providing a user interface, the method comprising:
receiving, using the hardware processor and the content surfacing software code, an initiation signal identifying a user;
identifying in response to receiving the initiation signal, using the hardware processor and the content surfacing software code, a plurality of content items as desirable content items to the user based on the user and metadata describing each of the desirable content items, wherein each of plurality of content items is a different audio-visual content;
displaying, on the user interface, using the hardware processor and the content surfacing software code, a networked map of nodes corresponding respectively to the desirable content items, wherein a distance between a first node and a second node of the networked map, when displayed on the user interface, is based on a similarity of a first metadata describing a first desirable content item corresponding to the first node to a second metadata describing a second desirable content item corresponding to the second node, and wherein the nodes of the networked map, when displayed on the user interface, are respective thumbnail images obtained from the desirable content items corresponding respectively to each node and selectable by the user.

12. The method of claim 11, wherein the respective thumbnail images, as displayed on the user interface, are sized according to their predicted desirability to the user.

13. The method of claim 11, wherein each of the desirable content items comprises one of a television program or a movie.

14. The method of claim 11, wherein the similarity of the first metadata to the second metadata is determined per storyline of at least one of the first desirable content item or the second desirable content item.

15. The method of claim 11, wherein each of the thumbnail images, as displayed on the user interface, depicts a character from the desirable content item corresponding respectively to each node.

16. The method of claim 11, further comprising:
receiving, using the hardware processor and the content surfacing software code, a content selection data identifying one of the desirable content items as a selected content item; and
navigating, using the hardware processor and the content surfacing software code, to a character biography window of the user interface, the character biography window profiling a character from the selected content item and enabling identification of at least one other character in another desirable content item having character traits similar to the character.

17. The method of claim 11, wherein the plurality of content items are identified as desirable content items to the user based on at least one of a character archetype, a character motivation, or a story archetype of each of the plurality of content items, and wherein the method further comprising:
displaying, on the user interface, the at least one of the character archetype, the character motivation, or the story archetype in association with two or more neighboring nodes of the nodes for display to the user via the user interface.

18. The method of claim 17, wherein the plurality of content items are further identified as desirable content items to the user based on a user consumption profile of the user.

19. The method of claim 11, further comprising:
receiving, using the hardware processor and the content surfacing software code, a content selection data identifying one of the desirable content items as a selected content item; and
navigating, using the hardware processor and the content surfacing software code, to a content recommendation window of the user interface.

20. The method of claim 11, further comprising:
receiving, using the hardware processor and the content surfacing software code, one of a content selection data or a content rejection data identifying one of the desirable content items; and
dynamically rearranging the networked map, using the hardware processor and the content surfacing software code, in response to receiving the one of the content selection data or the content rejection data.

* * * * *